United States Patent [19]

Eder

[11] 4,430,797
[45] Feb. 14, 1984

[54] PLOTTING DEVICE

[75] Inventor: Hans Eder, Accum/Schortens, Fed. Rep. of Germany

[73] Assignee: Franz Kuhlmann Prazisionsmechanik and Maschinenbau GmbH & Co. KG, Wilhelmshaven, Fed. Rep. of Germany

[21] Appl. No.: 358,100

[22] Filed: Mar. 15, 1982

[30] Foreign Application Priority Data

Mar. 17, 1981 [DE] Fed. Rep. of Germany ....... 3110271

[51] Int. Cl.³ ............................................ B43L 13/00
[52] U.S. Cl. ...................................... 33/1 M; 33/434; 33/438
[58] Field of Search .............. 33/1 M, 430, 432, 434, 33/433, 435, 436, 448, 474

[56] References Cited

U.S. PATENT DOCUMENTS 4,221,056 9/1980 Koenuma .............................. 33/438

FOREIGN PATENT DOCUMENTS 2717399 10/1978 Fed. Rep. of Germany .
2913961 10/1979 Fed. Rep. of Germany .

OTHER PUBLICATIONS

*Western Electric Technical Digest* No. 16–Oct. 1969, pp. 13-14 "System for Converting Rectangular Coordinate Signals Into Polar . . . ".

*Primary Examiner*—Willis Little
*Attorney, Agent, or Firm*—Pearne, Gordon, Sessions, McCoy, Granger & Tilberry

[57] ABSTRACT

A plotting device is disclosed containing a traveling carriage drawing apparatus and distance measuring devices in the traveling carriages which emit a number of electrical pulses which are proportional to the displacement of the traveling carriages and which are weighted with an adjustable scale factor, to be measured as coordinate values (x, y) of a basic Cartesian basic coordinate system. The measured coordinate values are transmissible to and recordable by indicator units located within the area of a traveling carriage. The basic coordinate system possesses a selectable, stationary zero point and fixed axis directions in the traveling direction of the traveling carriages. In order for the user to obtain, through appropriate collection and processing of coordinate values which are actually being plotted, the information required in a form particularly suited for the preparation and dimensioning with respect to execution of the drawing, and which specifically is CAD-compatible as well, conversion means are provided which transform the measured coordinate values into the values of a desired different coordinate system. In addition, there is provided a control unit with selector button array to allow selection of the desired coordinate transformation and to transmit the measured or transformed coordinate values, as desired, to the indicator units.

9 Claims, 2 Drawing Figures

PLOTTING DEVICE

FIELD OF THE INVENTION

The invention relates to a plotting device having a traveling carriage drawing machine with distance measuring devices on the traveling carriages. The distance measuring devices emit a number of electrical pulses proportionate to the displacement of the traveling carriage, which displacement is weighted with an adjustable scale factor and measured in coordinate values of a basic Cartesian coordinate system, and which values are displayed by an indicator unit located in the area of a traveling carriage.

BACKGROUND OF THE INVENTION

Plotting devices of this type are primarily employed on drawing boards and are equipped with a drawing head on the traveling carriage which covers the drawing board, which accepts two rulers at right angles to each other in the drawing plane. Such plotting devices can also be used with horizontal drawing tables with coordinate collection instruments or similar instruments, and are intended to facilitate for the user the preparation of drawings or the collection of coordinates.

German Offenlegunschrift No. 2,717,399 discloses a plotting device of the initially mentioned type in which the coordinates of the actual position of the drawing head or of the intersecting point of the ruler edges are collected in a basic Cartesian coordinate system. The zero point on the drawing plane can be determined randomly. However, due to the construction of the plotting device, the axes of the coordinates are always fixed in the traveling direction of the two traveling carriages. The actual measured coordinate values (x, y) of the basic system are determined, with a desired scale factor included if desired, by indicator units which are located in the traveling carriage or the drawing head.

It is possible with this known device to establish the zero point of the basic coordinate system, hereinafter called the "basic" system, at any selected spot of the drawing plane and to determine the measured coordinate values, weighted with a selected scale factor. For the user, drawing aids are selected with respect to dimensioning which facilitate quicker preparation of the drawing. Aside from assistance in drawing parallel lines and in the dimensioning of the finished drawing, however, the user receives no further assistance. The draftsman is specifically tied to the basic coordinate system, whereby particularly those portions of the drawing which consist of circular parts or similar parts must be prepared without further drawings aids, which limits the applicability of these known devices.

More recently, computer-assisted drawing (CAD) methods have been employed in the preparation of manufacturing or production drawings. Within the scope of such CAD methods, computers and storage devices, such as disc storage units or punch tape devices, are employed in the preparation of production drawings, for the purpose of storing a visual representation of drawings in the form of numerical data. Printout terminals can be connected to the input connector units of the storage coordinate collection instruments and plotters. It is the objective of these CAD methods to convert, with the least possible amount of programming and storage expenditure, the designs or drawings which were manually prepared at the drawing board into a set of numerical data which are stored in known storage media and which, if needed, can be retrieved and transmitted in the form of control signals to numerically controlled machines, such as tooling equipment or plotters.

In order to realize the conversion of a drawing into numerical data with the acceptable programming and storage expense, a drawing is prepared at the drawing board and is, in general, completely dimensioned. Subsequently, the contours of the drawn object or of the represented individual parts, are entered into a memory bank in some form of descriptive language. As form-describing language, certain base line elements are used, such as circles, straight lines, etc., in the most appropriate coordinate system for describing the particular line element. In each instance, the type of line element and the coordinates of the final point of the line element, which is to be drawn from an actual point of the entire line, must be stored. The dimensions recorded on the production drawing must in most instances be entered separately. This working method is only possible, despite huge expenditure of time, if, depending upon the type of line element which must be described, the most appropriate system of coordinates can in each case be employed and if a free and unimpeded transition into various systems of coordinates is possible at any time.

Alternatively, designs or drawings prepared manually at the drawing board can be collected via coordinate collection instruments, and can be digitalized and stored in the form of numerical data. In this process, the lines are, for instance, collected through regularly spaced coordinate values. In this process also, the storage requirement is significantly reduced if the collection of data and their storage can be effected based in each case on a coordinate system adapted to the particular line element.

The drawback with these known processes lies in the fact that the drawing must first be made by hand and must be completely dimensioned, and subsequently, on another instrument, the lines which were drawn during the preparation of the drawing must essentially be redrawn or traced, or simulated via an input device, so that they can be stored. It is particularly disadvantageous that a change in the contour and dimensioning of a drawing and a corresponding change in the memory contents are cumbersome and time-consuming, since the drawing must constantly travel back and forth between drawing board and coordinate collection device or other input device.

SUMMARY OF THE INVENTION

In contrast thereto, the purpose of the present invention is to provide an improved plotting device of the aforementioned type in such a fashion that the user, through appropriate collection and processing of actual coordinate values and with the actual drawing being carried out, will receive the information necessary for the preparation and dimensioning in a form which is particularly suitable for the execution of the drawing and which is also specifically CAD-compatible and thus directly suitable for storage in memory banks or numerically controlled equipment.

According to the present invention, this result is achieved by providing conversion means for the transformation of the measured coordinate values into coordinate values of a selectable different system of coordinates, and by providing a control unit with a selector button array for the selection of coordinate transformation and for the selective transmission of measured or transformed coordinate values to display indicator units.

The advantages of the present invention lie particularly in the fact that conversion means and a related control unit with selector button array are provided in order to convert, at the actual work location, the measured coordinate values of the basic coordinate system into any other desired system of coordinates which describes the line elements of the drawing in more adapted fashion than the basic system of coordinates, so that the transformed coordinates are then determined. The user can work with any location of the drawing field in a desired system of coordinates which is created and displayed at the indicator units from the originally measured coordinate values of the basic parallel slide-bar system through transformation. To the extent, for instance, that a section of the drawing merely consists of circular curves and initial straight lines, a polar system of coordinates will be particularly suitable for plotting or dimensioning these line elements. The user than arranges to have the conversion means according to the invention execute the transformation of basic coordinates into a polar coordinate system, so that the angles of the straight lines and the radii of the circular curves are directly determined.

The preferred design of the conversion means is such that the conversion of the measured coordinate value pair (x, y) of the basic right-angle system into the corresponding coordinate values of a turned and/or origin-displaced cartesian coordinate system is possible.

Additionally, the measured coordinate values (x, y) of the basic system can be converted into coordinate values of a polar system of coordinates, which, with respect to the basic system, is turned by a prescribed angle and/or loaded with a prescribed displacement of origin.

Alternatively, two differently transformed coordinate systems can also be computed. A coordinate value converted according to the first transformation may then be transmitted to one indicator unit and a coordinate value converted according to the second transformation or a measured, i.e., a non-transformed, coordinate value to the other indicator unit. In this manner, a mixed, transformed system of coordinates is displayed.

It is possible with the present invention to plot at any place of the drawing field any desired Cartesian or polar coordinate system, either turned or unturned, with respect to the basic system, and then to execute and/or dimension the drawing in this system.

The conversion means preferably comprises a memory in which several zero points can be stored and which can be loaded with its own system of coordinates, either turned or unturned, with respect to the basic coordinate system. The user need only determine, by programming of the selector button array, whether the first, second, third, fourth, etc. zero point is to be utilized. The conversion means will then convert the measured coordinate values into the particular system of coordinates which is to be effective for the particular zero point.

The preparation and dimensioning of drawings is significantly facilitated by the capability of transferring from an initial system of coordinates to a second or third coordinate system through the activation of a changeover button, inasmuch as larger drawings frequently show several sections or drafts which must be dimensioned from a separate reference or zero point.

In accordance with the present invention, the conversion means or the control unit includes a register whose contents designate the selected current coordinate transformation in each case, e.g., the type and zero point and direction of axis of the new coordinate system. The conversion means and the control unit then hold the type and position of the actual coordinate system as well as the actual coordinate values in this system for ready availability. Thus, all the information is available which is required for description of line elements in the different coordinate systems particularly adapted to the line elements.

It is therefore preferable to provide a memory in which can be stored the data required for describing the actual coordinate system as well as the actual coordinate values when the user, through actuation of a selector button, puts the conversion means in a "reading" mode and subsequently enters the actual coordinate values for storage into the memory.

Connected to the output side of the memory and the control register is a data processing unit which has a processor and a program button array, and which at the exit has a standard interface and which reads the data from the memory and the control register and renders them in a form suitable for further processing in a numerically controlled machine or storage unit.

The plotting device with the required conversion means for transformation of coordinates as well as the data processing unit on the output side facilitate simple production and dimensioning of drawings as well as storage of actual coordinate values in appropriate coordinate systems.

Accordingly, during the preparation of the drawing, line elements are gathered in the appropriate shape-description language and can be stored as the drawing is being prepared. The plotting device according to the invention thus provides the function both of traditional plotting equipment and a coordinate collection apparatus and an input device. With the aid of a display screen, it is even possible to carry out the design function at the drawing board as iterative process, supported by a computer, inasmuch as, for instance, the latest valid version of the drawing detail can be called out of storage onto the display screen, while the draftsman can execute a new design and compare it with the previous design.

BRIEF DESCRIPTION OF THE DRAWINGS

An embodiment of the invention is explained in more detail below with respect to the drawings, in which.

DETAILED DESCRIPTION OF THE PREFERRED EMBODIMENT

Figure 1:
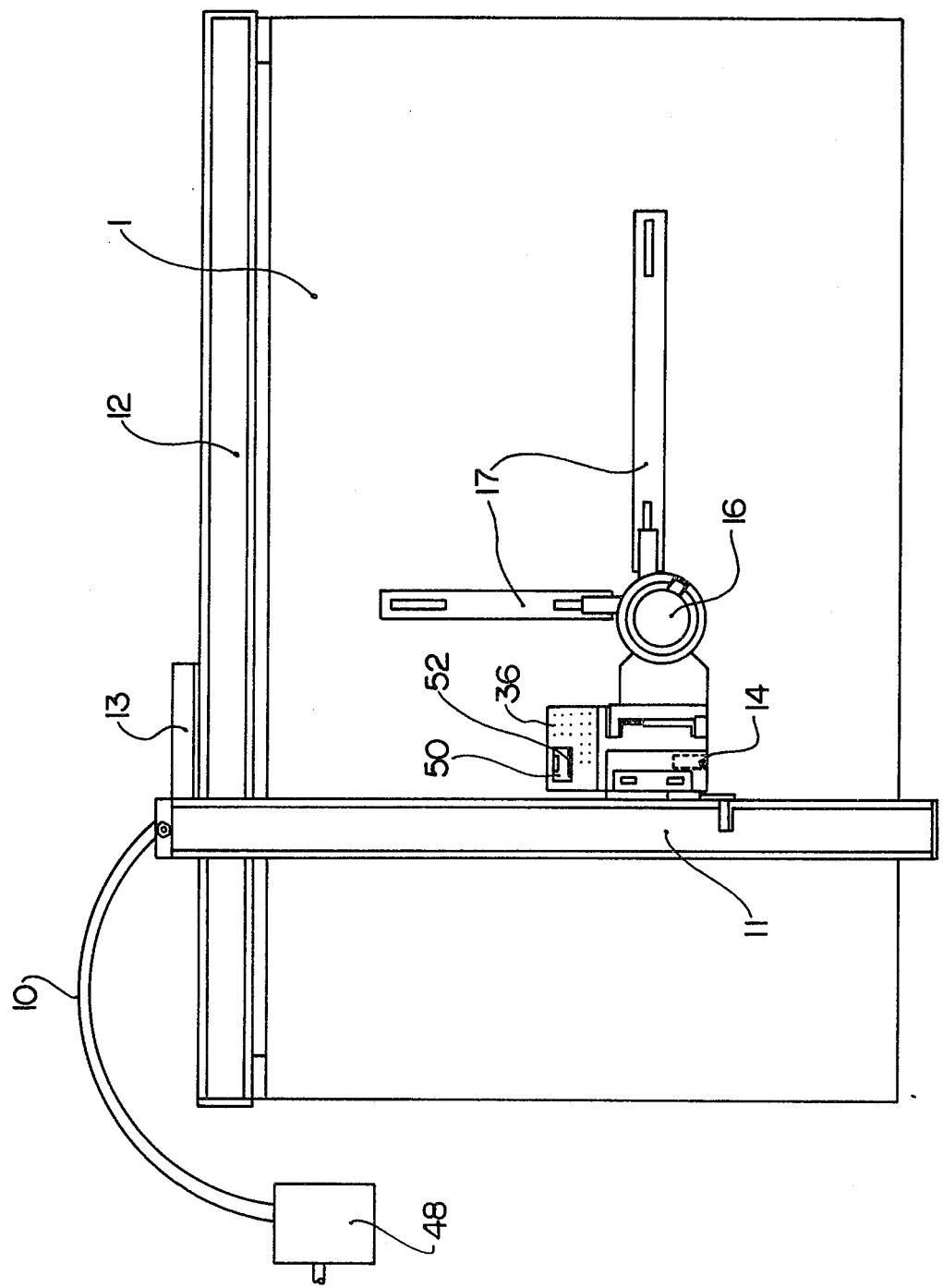
FIG. 1 is a plan view of a plotting device according to the invention, which is mounted onto a drawing board.

FIG. 1 illustrates a plotting device which is attached to a drawing board 1 and which carries a horizontal traveling track 12 and a first traveling carriage 13 displaceable along the traveling track 12. A vertical traveling track 11 is attached to the carriage 13. A second traveling carriage 14 is carried on the traveling track 11. On the second traveling carriage 14 there is mounted a drawing head 16 on which are attached two demountable rulers 17 at right angles to each other in the drawing plane. On the traveling carriage 14 there is arranged the selector button array 36 with the two indicator units 50 and 52. Within the housing for the traveling carriage 14 and selector button array 36 there is placed conversion means for executing the desired coordinate transformations, which are connected via electric rails (not shown) within the traveling track 11 to a connection cable 10 leading to a data processing unit 48, which is permanently attached to other drawing equipment or drawing apparatus. The traveling direction of the two traveling carriages 13 and 14 determines the direction of each axis of a basic system of Cartesian coordinates.

Figure 2:
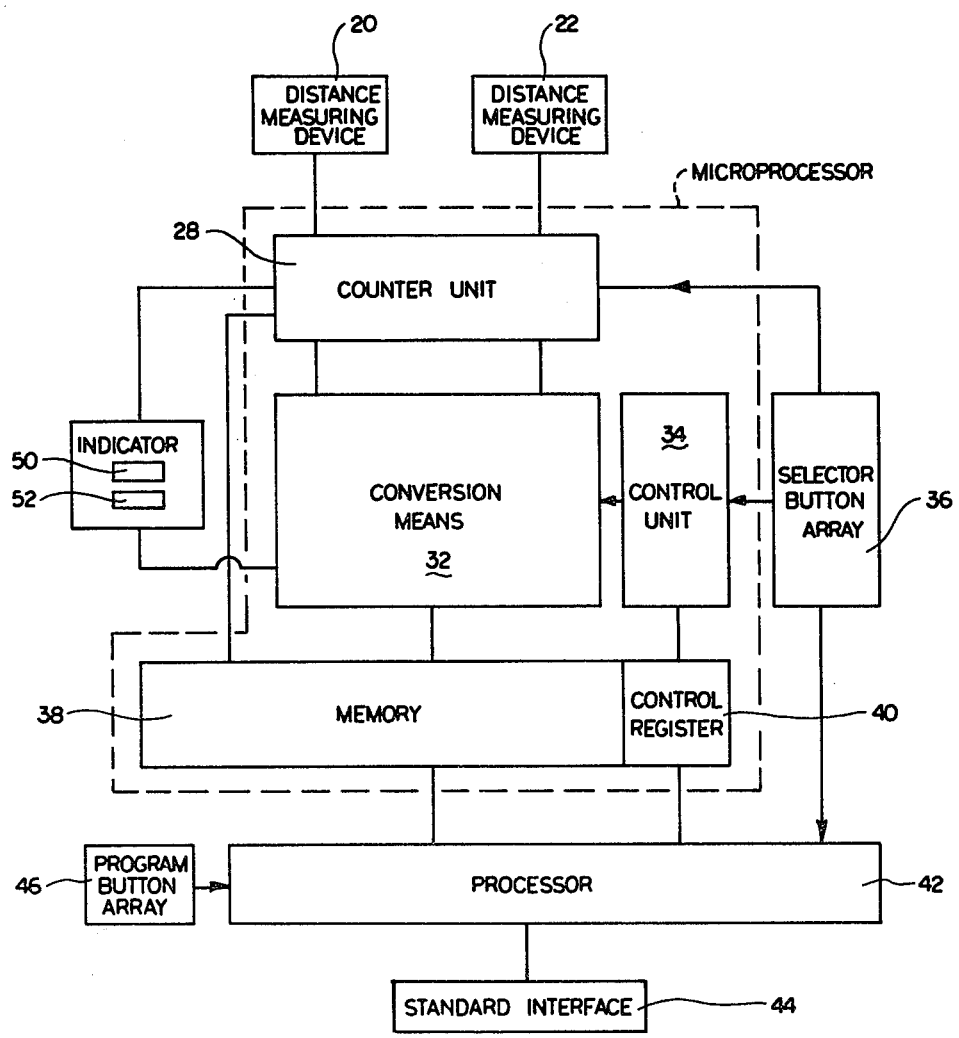
FIG. 2 is a schematic diagram of the device according to the invention.

On the two traveling carriages 13 and 14 there are attached distance measuring devices 20 and 22 (FIG. 2), which emit a number of electrical pulses proportional to the displacement of the traveling carriages. Directional discriminators within each distance measuring device also provide and emit a signal which indicates the direction of the displacement of the carriage.

The electrical pulses produced by the distance measuring devices 20 and 22 are transmitted together with the directional signal to a counter unit 28, where they are weighted with an adjustable scale factor and then measured as coordinate values x, y of the basic Cartesian coordinate system. The measured coordinate values are displayed at the indicator units 50 and 52, which are placed within the selector button array 36 and which are located in the area of the second traveling carriage 14 (FIG. 1). The scale factor used during the counting of the distance pulses is controlled by the selector button array 36. The weighting of the scale factor can be effected either according to "hardware" or "software".

The counter unit 28 transmits the measured coordinate values x, y to a conversion means 32 which is controlled by a control unit 34. The control unit 34 can be activated by the user via the selector button array 36. The conversion means 32 executes a transformation, using software function or using hardware switching, of the measured coordinate values x, y, into the corresponding coordinate values of a selectable different coordinate system. By means of the control unit 34, it is possible to select at the button array 36 the desired coordinate transformation. The desired type of coordinate system (Cartesian or polar), the zero point of the desired coordinate system, and the direction of the axis or the position of the zero straight line can be selected through operation of appropriate selector buttons.

At their output side, the conversion means 32 emit the transferred coordinate values x', y', or R,$\phi$; or R', $\phi'$ or mixed transformed coordinate values, and, depending upon operation of the selector button array 36, the measured coordinate values can be transmitted and determined by the counter unit 28 or the transformed coordinate values by the conversion means 32 to the indicator units 50, 52 for display.

The conversion means 32 is connected to a memory 38, and the control unit 34 is connected to a control register 40. The data of the actual coordinate system selected via the selector button array 36, i.e., the type of coordinate transformation, position of original coordinates, orientation of coordinate system, etc., are stored in the control register 40, and are available upon request.

Several zero points can be stored in the memory 38 for different systems of coordinates, which, upon pressing the appropriate button, are read into the conversion means 32 and also into the control register 40, so that they are available in the conversion means 32 for computation of the desired coordinate transformation. Additionally, upon a read command from the selector button array 36, the actually indicated coordinate values are stored in the memory 38.

The counter unit 28, the conversion means 32, the control unit 34, the control register 40, and the memory 38 can be embodied in a microprocessor which, upon entering of the desired coordinate system, carries out the desired transformation of measured coordinate values x, y into the transformed coordinate values pursuant to software.

Connected to the output side of the memory 38 and the control register 40 is the data processing unit 48 (FIG. 1) which contains a processor 42 that reads the data which are stored in the memory 38 and in the control register 40 and processes same in such manner that these data, which denote the actual coordinate values in the actual coordinate system, can be transmitted in the desired form to a standard interface 44. The data processing unit 48 has its own program button array 46 by means of which the data processing can be programmed in such fashion that the data which were transmitted to the standard interface can be processed in the connected apparatuses, without additional programming.

What is claimed is:

1. A plotting device comprising
   a traveling carriage having a drawing head;
   means for measuring distances traveled by said carriage, said measuring means emitting a signal representing the displacement of said traveling carriage;
   a counter for determining measured values of coordinates in a basic Cartesian coordinate system from said signal emitted by said measuring means;
   an indicator unit in which said measured coordinate values may be displayed;
   conversion means for transforming said measured coordinate values into coordinate values of a selective other coordinate system;
   a control unit with means for selecting coordinate transformation and selective output of measured or transformed coordinate values to said indicator unit;
   a memory unit for storing selected individual coordinate values from said conversion means;
   a register whose contents designate the selected respective actual transformation of coordinates; and
   a data processing unit connected with said memory unit, said register, and said control unit for receiving coordinate values from said memory unit and the associated contents from said register and for transmitting said received coordinate values and associated register contents via a standard interface for further processing in storage equipment or operating equipment which may be connected to said standard interface.

2. A plotting device according to claim 1, wherein said conversion means selectively transforms said measured coordinate values into corresponding coordinate values of a Cartesian system of coordinates having a selectively turned axis or displaced point of origin.

3. A plotting device according to claim 1, wherein said conversion means transforms the measured coordinate values into corresponding coordinate values of a polar coordinate system which is rotated by a predetermined angle and provided with a predetermined displacement of original location with respect to the basic Cartesian coordinate system.

4. A plotting device according to claim 1, wherein said conversion means through appropriately selected actuation of the control unit transforms the measured coordinate values into corresponding coordinate values of two differently transformed coordinate systems, wherein the coordinate value transformed according to a selected transformation of coordinates is displayed on one part of said indicator unit and a coordinate value transformed according to another coordination transformation system or a measured coordinate value is displayed in another part of said indicator unit.

5. A plotting device according to claim 1, wherein said memory unit contains data for several basic coordinate systems in the drawing plane covered by the traveling carriage, each with its own respective zero points, and wherein said control unit via said selecting means facilitates the random selection of one of the various basic coordinate systems, and wherein said conversion means in each case receives the measured coordinate values of the actual basic coordinate system and transforms said measured values into the corresponding values of another selected coordinate system, whereby the transformed coordinate system relative to origin of the basic coordinate system has been transformed.

6. A plotting device according to claim 1, wherein said selecting means of said control unit contains operating mode selectors whose activation puts said memory unit into a reading condition or clears from said memory unit the data stored therein, and said selecting means includes storage mode selectors which, upon activation, cause the actually indicated coordinate values and the contents of the control register to be stored in said memory unit to be retrieved by said data processing unit.

7. A plotting device according to claim 1, wherein the data processing unit includes a program selection means located within the area of said traveling carriage.

8. A plotting device according to claim 1, wherein said counter, said conversion means, said control unit, said register, and said memory unit are included in a microprocessor and are located in the traveling carriage adjacent to the indicator unit.

9. A plotting device according to claim 8, wherein the data processing unit is mounted in a stationary manner at the plotting device and connected by means of conductive lines with the conversion means located in the traveling carriage.

* * * * *